United States Patent
Hooli et al.

(10) Patent No.: US 9,615,354 B2
(45) Date of Patent: Apr. 4, 2017

(54) DEVICE-TO-DEVICE COMMUNICATIONS IN CELLULAR SYSTEM

(75) Inventors: Kari Juhani Hooli, Oulu (FI); Kari Veikko Horneman, Oulu (FI); Vinh Van Phan, Oulu (FI)

(73) Assignee: Nokia Solutions and Networks Oy, Espoo (FI)

( * ) Notice: Subject to any disclaimer, the term of this patent is extended or adjusted under 35 U.S.C. 154(b) by 335 days.

(21) Appl. No.: 13/054,511

(22) PCT Filed: Jul. 17, 2008

(86) PCT No.: PCT/EP2008/059346
§ 371 (c)(1),
(2), (4) Date: Jan. 25, 2011

(87) PCT Pub. No.: WO2010/006649
PCT Pub. Date: Jan. 21, 2010

(65) Prior Publication Data
US 2011/0134827 A1 Jun. 9, 2011

(51) Int. Cl.
*H04W 72/04* (2009.01)
*H04B 7/26* (2006.01)
(Continued)

(52) U.S. Cl.
CPC ........... *H04W 72/04* (2013.01); *H04B 7/2606* (2013.01); *H04W 84/047* (2013.01); *H04W 88/04* (2013.01); *H04W 88/06* (2013.01)

(58) Field of Classification Search
CPC .... H04B 7/2606; H04B 7/155; H04B 7/2643; H04B 7/2656; H04W 88/04; H04W 16/26;
(Continued)

(56) References Cited

U.S. PATENT DOCUMENTS

| 6,473,617 B1* | 10/2002 | Larsen et al. ................. 455/446 |
| 2002/0034945 A1* | 3/2002 | Hamada ........................ 455/435 |

(Continued)

FOREIGN PATENT DOCUMENTS

| DE | 100 27 115 A1 | 12/2001 |
| EP | 1 503 544 A2 | 2/2005 |

(Continued)

OTHER PUBLICATIONS

IEEE Std 802.11™-2007 (Revision of IEEE Std 802.11-1999 ) IEEE Standard for Information technology—Telecommunications and information exchange between systems—Local and metropolitan area networks—Specific requirements Part 11: Wireless LAN Medium Access Control (MAC) and Physical Layer (PHY) Specifications Jun. 12, 2007, (1232 pages).

*Primary Examiner* — Peter Cheng
*Assistant Examiner* — Natali N Pascual Peguero
(74) *Attorney, Agent, or Firm* — Harrington & Smith

(57) ABSTRACT

The present invention provides a method and a controller to control not only cellular radio connections in a cell of a cellular communication system but also direct device-to-device communication links established between terminal devices within the cell. Particularly, the controller selects portion of the terminal devices to function as relay terminals for the other terminals to enable relayed communication links between the terminal devices and the base station through the relay terminals. The relay terminals link device-to-device connections to the cellular radio connections between the relay terminals and the base station.

25 Claims, 3 Drawing Sheets

(51) Int. Cl.
*H04W 84/04* (2009.01)
*H04W 88/04* (2009.01)
*H04W 88/06* (2009.01)

(58) Field of Classification Search
CPC ... H04W 84/047; H04W 72/04; H04W 88/08;
H04W 76/00; H04W 72/0446
USPC ............... 370/315, 329, 337; 455/11.1, 13.1
See application file for complete search history.

(56) References Cited

U.S. PATENT DOCUMENTS

| | | |
|---|---|---|
| 2004/0179492 A1* | 9/2004 | Zhang et al. ................ 370/331 |
| 2005/0113022 A1* | 5/2005 | Pearson ....................... 455/11.1 |
| 2007/0142058 A1 | 6/2007 | Matsumura et al. ....... 455/452.2 |
| 2008/0084844 A1* | 4/2008 | Reznik et al. ............... 370/330 |
| 2008/0254819 A1* | 10/2008 | Niwano et al. .............. 455/522 |
| 2009/0080395 A1* | 3/2009 | Takenaka ..................... 370/338 |
| 2009/0288145 A1* | 11/2009 | Huber et al. ..................... 726/3 |

FOREIGN PATENT DOCUMENTS

| | | |
|---|---|---|
| EP | 1 763 266 A1 | 3/2007 |
| EP | 2134116 A1 * | 12/2009 |
| WO | WO 2006/043902 A1 | 4/2006 |
| WO | WO 2006043902 A1 * | 4/2006 |

* cited by examiner

DEVICE-TO-DEVICE COMMUNICATIONS IN CELLULAR SYSTEM

FIELD

The invention relates to the field of cellular radio telecommunications and, particularly, to utilization of direct device-to-device connections in a cellular communication system.

BACKGROUND

Modern cellular telecommunication systems and terminals of such systems are capable of supporting device-to-device communication capabilities for efficient and cost-effective content delivery, network operation and performance. Accordingly, two terminals located relatively close to each other in the same cell may be configured by the network to communicate over a direct connection instead of routing the data through a cellular network. It is even known that an ad hoc network among multiple terminal devices may be formed based on the IEEE 802.11 standard, for example, and connections with the cellular network may utilize this ad hoc network to improve the overall coverage and performance of the cellular system. However, more efficient utilization of such ad hoc networks would be advantageous from the viewpoint of the cellular telecommunication system.

BRIEF DESCRIPTION

According to an aspect of the present invention, there is provided a method as specified in claim 1.

According to another aspect of the present invention, there is provided an apparatus as specified in claim 16.

According to another aspect of the present invention, there is provided an apparatus as specified in claim 31.

According to yet another aspect of the present invention, there is provided a computer program product embodied in a computer readable distribution medium as specified in claim 32.

Embodiments of the invention are defined in the dependent claims.

LIST OF DRAWINGS

Embodiments of the present invention are described below, by way of example only, with reference to the accompanying drawings, in which FIG. 1 illustrates communication links in a cell of a mobile telecommunication system according to an embodiment of the invention;

DESCRIPTION OF EMBODIMENTS

The following embodiments are exemplary. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments.

Figure 1:
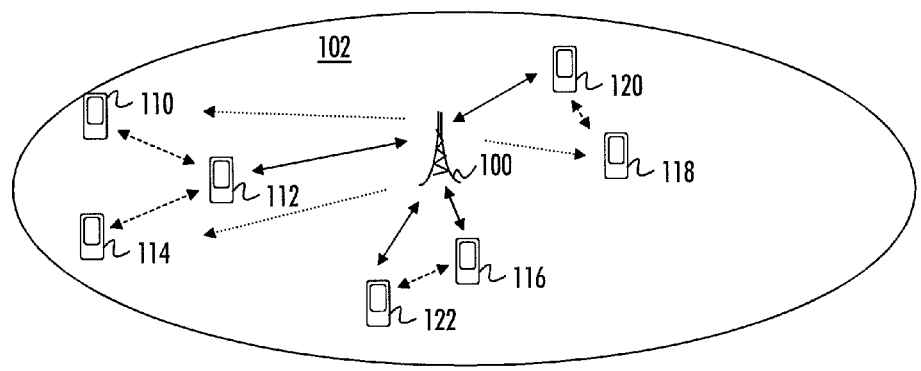

FIG. 1 illustrates communication links in a cell 102 of a mobile telecommunication system according to an embodiment of the invention. Referring to FIG. 1, the cell 102 is associated with a base station 100 controlling communications within the cell. The cell 102 controlled by the base station 100 may be divided into sectors, but such a scenario is not illustrated in greater detail in order to keep the focus on the invention. The base station 100 may control cellular radio communication links established between the base station 100 and a plurality of terminal devices 110 to 122 located within the cell 102.

As noted in the background section, device-to-device connections and ad hoc networks may be established among the terminal devices 110 to 122. Let us now discriminate the cellular radio connections from the device-to-device connections by denoting that a cellular radio communication link established directly between a terminal device and the base station 100 belongs to a first set of communication links. The first set of communication links may be established and operated according to a given radio standard supported by the mobile communication system of the base station 100. Such a standard may be a long-term evolution of the UMTS (Universal Mobile Telecommunication System), for example.

Furthermore, device-to-device communication links established directly between two terminal devices, e.g. between terminal devices 118 and 120 in FIG. 1, belong to a second set of communication links. The device-to-device connections may be based on cognitive radio technology. Accordingly, the terminal devices may be equipped with cognitive radio capability to provide the device-to-device communication links according to any of a plurality of radio access technologies. Moreover, the terminal devices are equipped with a capability to adaptively select one of the supported radio access technologies according to the communication environment. Such radio access technologies may include standard and non-standard radio access technologies, e.g. Wireless LAN (IEEE 802.11), Bluetooth®, Ultra Wide Band. The radio access technologies may operate on the same frequency band as the first set of communication links and/or outside those frequency bands to provide the arrangement with flexibility.

According to an embodiment of the invention, the base station 100 selects some of the terminal devices to function as relay terminals for the other terminal devices so as to provide a relayed link between the non-relay terminals and the base station 100. Only some of the terminals 110 to 122 is selected as the relay terminals in order to establish a hierarchical or tree-type structure for the communication links and to prevent numerous links wasting communication resources and causing unnecessary interference. Referring to FIG. 1, the base station 100 selects terminal devices 112 and 120 to function as the relay terminals and configures the terminal devices 112 and 120 accordingly. The relay terminals may be selected according to environmental properties of the terminal devices and of the cell, allocated radio resources, etc., as will be described below. When the terminal devices 112, 120 have been configured and are ready to function as the relay terminals, they may establish communication links of the second set, i.e. cognitive radio-based communication links, with the other terminal devices 110 to 118, 122 to provide a link between the other terminal devices and the base station 100. Referring to FIG. 1, the relay terminal 112 establishes a communication link of the second set with terminal devices 110 and 114 to provide the terminal devices 110 and 114 with a relayed link to the base station. Similarly, the other relay terminal 120 establishes a communication link of the second set with the terminal device 118. When establishing the relayed communication link, the relay terminal 112, 120 is configured to establish the communication link of the second set with a terminal device requesting the relayed link according to a selected radio access technology, to negotiate with the base station of the establishment of a cellular radio communication link associated with the relayed connection, i.e. associated with the terminal device requesting the relay, and to map the communication link of the second set with the negotiated cellular radio communication link. The mapping may be carried out on a suitable protocol layer below the application layer, e.g. on a medium access control layer. Then, the relay terminal 112, 120 forwards data related to the negotiated cellular radio link and received from the base station to the communication link of the second set and vice versa in order to forward data received from the non-relay terminal device to the base station and to forward data received from the base station and destined to the non-relay terminal to the established communication link of the second set.

The base station may select and define which radio access technologies should be currently used for the communication links of the second set. The selection may depend on the utilization of the radio resources, properties of the communication environment, and properties of the selected relay terminals. Accordingly, the base station configures the relay terminals to provide only the communication links of the second set. Furthermore, the base station may broadcast information indicating the selected radio access technologies to help the terminal devices to establish communication links of the second set. For example, the terminal devices get knowledge about broadcast channels to scan when attempting to establish a communication link of the second set.

Referring to FIG. 1, solid line signaling links (lines with arrows) indicate the communication links of the first set, i.e. direct communication links between the base station and terminal devices, dashed lines indicate the communication links of the second set, i.e. direct communication links between terminal devices established with cognitive radio technology, and dotted lines indicate broadcast information broadcasted by the base station to facilitate the establishment of the communication links of the second set. In addition to controlling only the communication links of the second set related to the relayed links, and the regular cellular radio communication links, the base station 100 may also control radio access technologies used for the device-to-device connections between two terminal devices not in need of the cellular radio connection. This provides efficient radio resource management in the cell.

As mentioned above, the base station of the cellular mobile telecommunication system controls both cellular radio connections, as in the conventional system, and cognitive radio-based device-to-device communication links to provide relayed connections between the base station and the terminal devices. The control of the cognitive radio communication links may be embedded in radio resource control signaling of the cellular system. Accordingly, terminal devices that have established a radio resource control (RRC) connection with the base station may have their cognitive radio links controlled by the base station. The control of the cognitive radio communication links may be carried out when a terminal device is either in an RRC idle state or in an RRC connected state. In an RRC idle state, the terminal device has no active connection with the base station and no allocated radio resource but is capable of receiving RRC signaling information broadcasted by the base station. In the RRC connected state, a radio resource controller of the base station has allocated radio resources to the terminal device for data transfer. Additionally, the terminal device may be directly configured by the base station through RRC signaling. The RRC signaling may be used to configure the radio access technologies and communication parameters of the cognitive radio communication links.

Figure 2:
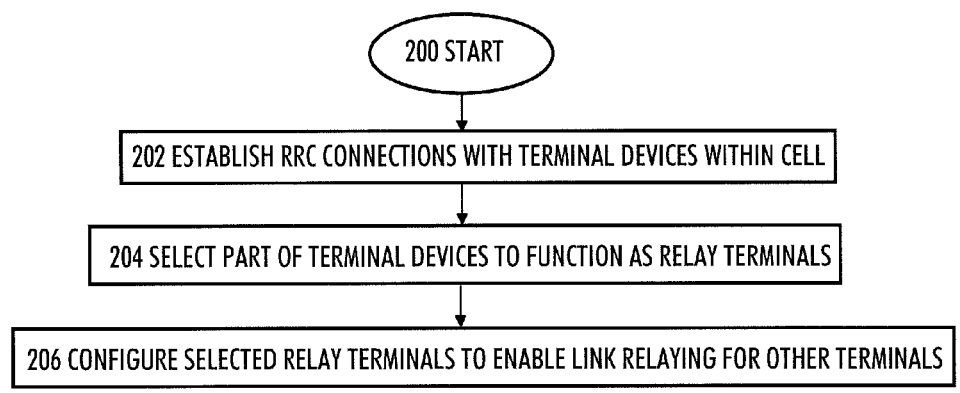
FIG. 2 is a flow diagram illustrating a process for selecting and configuring relay terminals by a controller of a base station according to an embodiment of the invention.

FIG. 2 is a flow diagram illustrating a process for selecting and configuring relay terminals according to an embodiment of the invention. The process may be realized by a computer process executed in one or more controllers (or processors) of the base station. The process starts in block 200.

In block 202, RRC connections with terminal devices are established. The establishment of RRC connections refers to configuring terminal devices to RRC connected state. Not all the terminals located in the cell associated with the base station are necessarily configured to the RRC connected state, because some of the terminal devices may not have a current need for a data transfer connection.

In block 204, some of the terminal devices in the RRC connected state are selected to function as the relay terminals. Several parameters may be considered when selecting the relay terminals, such as capabilities of the terminal devices, radio resource utilization in the cell, battery power of the terminal devices, traffic conditions of the terminal devices, channel qualities experienced by the terminal devices, locations (distribution) of the terminal devices in the cell. The base station may continuously receive measurement reports and other information on the capabilities and properties of the terminal devices. The measurement reports may comprise channel quality reports received from terminals in the RRC connected state. Naturally, the base station has knowledge of the radio resources and traffic conditions of the cellular radio links of the terminal devices, because the base station controls the radio resource management and traffic control for the terminal devices. In case the base station utilizes a distributed antenna system in the cell, the location of a given terminal may also be deduced on the basis of an antenna receiving the (strongest) signals from the terminal device.

An algorithm may be executed in block 204 to consider the conditions of the terminal devices and the overall conditions of communication in the cell to select the most optimal selection of the relay terminals. First of all, the algorithm may estimate the number of relay terminals needed in the cell. The estimation may be carried out on the basis of traffic load in the cell and communication environment determined from the measurement reports received from the terminal devices in the RRC connected state. Then, the algorithm may carry out the actual selection of the relay terminals.

The algorithm may select only terminals with cognitive radio capability as the relay terminals. Moreover, the algorithm may select a relay terminal to provide a terminal device hidden from the base station or in unfavorable conditions (poor channel conditions, low battery power, etc.) with a relayed communication link through the relay terminal. The algorithm may also consider the occupation of frequency bands allocated to cellular radio communication links in order to determine whether to use radio access technologies utilizing the frequency bands of the cellular radio or other (unlicensed) frequency bands. Upon determination of the frequency bands and radio access technologies utilized for the communication links of the second set (cognitive radio links), the algorithm may select the terminal devices that support the selected radio access technologies and discard those that do not. Then, the algorithm may consider the current communication properties, e.g. location, channel environment, traffic load, and battery power of the terminal devices. The algorithm may select the terminal devices that are in a good channel environment, have low traffic load, and good battery power. The locations of the terminal devices may affect the selection in such a way that the number of relay terminals selected from a specific area in the cell is proportional to an estimated need for relay terminals in that area. For example, if a terminal is indicating a low battery in a specific area, a relay terminal may be established next to that terminal so that a short-range relay link may be established between the terminal and the relay terminal, and the relay terminal may carry out the long-range communication with the base station.

The algorithm may give determined weighting to the above-mentioned criteria for the selection of the relay terminal. The algorithm may be executed periodically or continuously to adapt to the changing radio environment and to add new or remove relay terminals and to change radio access technologies and transmission parameters of the cognitive radio communication links used for the relaying connections. Alternatively, the algorithm may be triggered by a determined event in the cell, e.g. detection of several terminal devices in unfavorable conditions in a given area.

Upon selection of the relay terminals, the selected relay terminals are configured to enable link relaying for the other (non-relay) terminal devices. The configuration may comprise generating and transmitting to the selected relay terminals a configuration message comprising information on the selected radio access technologies for use as the cognitive radio communication links and parameters, such as communication parameters defining allocated resources, modulation and coding schemes, diversity transmission schemes. The configuration message may configure the relay terminal to advertise to its surroundings that it is available for provision of a relayed link to the base station such that the other terminal devices detecting the advertisement may establish a cognitive radio connection with the relay terminal. The advertisement may be realized by a broadcast of one or more beacon signals according to the radio access technology or technologies selected by the algorithm and configured for use in the relay terminal. Additionally, the advertisement may indicate the base station to which the relay terminal provides the relayed link. Accordingly, the advertisement may comprise an identifier of the base station. The operation of the relay terminals is discussed in greater detail later.

Figure 3:
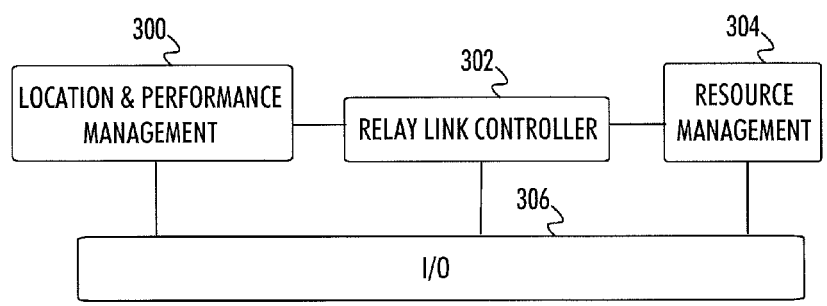
FIG. 3 illustrates functional elements of the controller according to an embodiment of the invention.

FIG. 3 illustrates functional elements of the controller implementing the process of FIG. 2. As mentioned above, the controller may control operation and functionalities of the base station and communication links in the cell associated with the base station. The controller comprises an interface 306 to enable transmission and reception of signals and information related to the communication in the cell. The interface 306 may provide a connection to signal processing elements of the base station that perform signal processing necessary for transmission and/or reception of a radio signal between the base station and the terminal devices. Alternatively, the interface 306 may be a software interface to other software modules executed by the same physical controller implemented by a digital signal processor, micro controller, etc.

The controller further comprises a resource management module 304 configured to handle management and allocation of cellular radio resources allocated to the base station by the mobile communication system. The management of the cellular radio resources and their allocation to the communication links of the first set may be carried out according to any radio resource allocation scheme known in the art. In the context of the invention, it is advantageous for the efficient allocation of radio resources to the cognitive radio links to have knowledge of the radio resources currently occupied by the cellular radio communication links.

The controller may further comprise a location and performance management module 300. This module receives regular updates of information on the communication properties of the terminal devices and the radio channel. The location and performance management module 300 may receive measurement reports from the terminal devices through the interface 306, and additional information related to the locations of the terminal devices and their current communication properties. The locations of the terminal devices may be monitored with a positioning procedure based on the analysis of handover measurement reports and/or separate location reports received from the terminal devices. The terminal devices may constantly monitor their locations with a positioning system, e.g. GPS, and inform the serving base station of their location. The positioning based on the analysis of the handover measurement results may be based on the candidate neighbor base station list of a terminal device, received signal strength associated with each base station, and known topology and environment of the cell, e.g. shadowed locations in the cell and shape of the cell and neighboring cells.

The controller further comprises a relay link controller 302 configured to execute the selection algorithm described in connection with FIG. 2 and to configure the selected relay terminals for providing the cognitive radio links to be used for relaying. The relay link controller 302 is also configured to manage and reconfigure the relay terminals, if necessary. For example, a changing radio environment or traffic load in the cellular communication links may cause a need to change the radio access technologies and/or parameters used for the cognitive radio links, to add new relay terminals or to cancel relaying of specific relay terminals.

Instead of implementing the location and performance management module 300 and the resource management module in the same controller as the relay link controller 302, the modules 300 and 304 may be implemented in a different controller, and the relay link controller 302 may communicate with the modules 300, 304 through the interface 306.

It has been described above that the terminal devices in the RRC connected state may send the measurement reports to the base station. In mobile cellular networks, the terminal devices in the RRC idle state do not send the measurement reports regularly. According to an embodiment of the invention, the base station may selectively configure and request a cognitive radio-capable terminal device in the RRC idle state to send a measurement report of the surrounding radio environment in the cell the terminal device camps in to the base station in order to keep track of the local-cell radio environment for cognitive radio networking. The measurement report may include relay terminals (and/or other cognitive radio capable terminals) detected by the terminal device. Additionally, the measurement report may comprise an estimate of the quality of the channel between the terminal device and each detected terminal device. In more detail, the base station may configure the terminal device by using broadcast control signaling on, for example, a broadcast control channel or paging channel to carry out the measurements and to enter the RRC connected state to send the measurement report to the base station. The terminal device may send the measurement report through a direct cellular connection with the base station or through a relayed connection through a relay terminal. Upon transmission of the measurement report, the terminal device may return to the idle state. This measurement reporting of cognitive radio-capable terminal devices in RRC idle state may also be configured to be carried out along with regular mobility procedures of idle terminals, such as location update procedures.

In an embodiment, the base station may configure terminal devices in the RRC idle state to transmit a location update message indicating the location of the terminal device to the base station. The location update of the idle terminals may be requested periodically. The base station may configure the terminal devices (or the terminal device may be configured) to transmit the location update message primarily through a relay link provided by a relay terminal. Accordingly, the terminal device does not have to enter the RRC connected state to transmit the location update.

Figure 4:
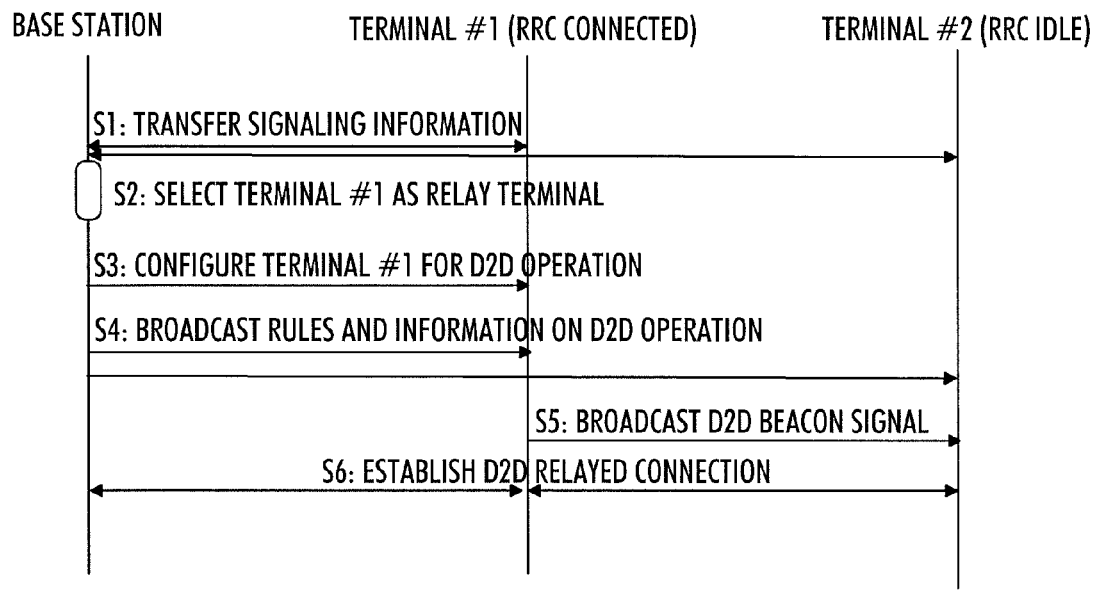
FIG. 4 is a signaling diagram illustrating a procedure for establishing a relay link for a terminal device according to an embodiment of the invention.

FIG. 4 is a signaling diagram illustrating a procedure for establishing a relay link for a terminal device according to an embodiment of the invention. The signaling diagram comprises signaling carried out between the base station comprising the controller of FIG. 3, a first terminal device (terminal #1) in the RRC connected state with the base station, and a second terminal device (terminal #2) in the RRC idle state with the base station.

In S1, the base station exchanges signaling information with the terminal devices. The base station receives channel quality information and handover measurement reports from the first terminal device. Additionally, the base station allocates radio resources to the first terminal device and a temporary identifier and corresponding control information to the second terminal device. The temporary identifier of a terminal device in the RRC idle state may be refreshed or renewed upon registration and/or location update of an idle terminal, as is known in the art. Such a temporary identifier may be a paging token enabling the base station to page the idle terminal device. Alternatively, the identifier may be a fixed identifier, such as a radio frequency identifier (RFID) of the terminal device. The RFID may be a unique identifier assigned to the terminal device in the manufacturing or testing stage, and the terminal device may send its RFID to the cellular network upon registration to the cellular network.

In S2, the base station decides to select the first terminal as a new relay terminal. The decision may be based on the execution of the algorithm described above with reference to block 204 of FIG. 2. In S3, the base station configures the first terminal to device-to-device operation, i.e. to act as the relay terminal, as described above with reference to block 206 of FIG. 2 and FIG. 3. Accordingly, the base station provides the first terminal with information comprising notification that the first terminal is to be used as the relay terminal, radio access technologies to be used for the device-to-device cognitive radio connections used in connection with relaying, and transmission parameters of such device-to-device connections. The base station may also provide prioritization for the radio access technologies to be used for the relayed connections. The base station may also configure the first terminal to advertise its availability as the relay terminal in a specific manner, as will be described later in connection with FIG. 6. The configuration of the first terminal device may be carried out as part of radio resource control signaling exchanged between the base station and the first terminal.

In S4, the base station broadcasts a broadcast signal comprising rules and information of the device-to-device operation. The rules and information broadcasted by the base station may comprise general rules to be applied to any communication link of the second set, i.e. even to those not used for relayed connection. Thus, the base station may provide centralized control of all cognitive radio communication links in the cell. Alternatively or additionally, the broadcasted information may comprise control information specific to relayed connections. The rules may comprise identification of radio access technologies to be used for relayed connections. The radio access connections may be prioritized so that one radio access technology is favored over another. The base station may also broadcast rules of utilization of the relayed links so that the terminal devices use the relayed connections in a desired manner. The base station may broadcast, for example, threshold values for the quality of connection with the base station or with neighboring base stations to trigger utilization of the relayed link for a given terminal device when the quality of the cellular radio communication link drops below the threshold. The quality of the communication link may be measured from a carrier-to-interference ratio, for example.

The base station may broadcast the rules and information related to the relayed links on a broadcast control channel available to all terminal devices in the cell, i.e. to those equipped with cognitive radio capability and those not equipped with such capability. Alternatively, the base station may broadcast the rules and the information on a channel which is dedicated to terminal devices equipped with cognitive radio capability. In a yet alternative embodiment, the base station may send the rules and the information individually to each terminal device as part of radio resource control signaling. Accordingly, the terminal devices capable of reading the rules and information may be in the RRC idle or RRC connected state.

In S5, the first terminal device configured as the relay terminal transmits one or more beacon signals advertising its availability as the relay terminal. The relay terminal may broadcast beacon signals of those radio access technologies the base station has selected for use in the relayed links. The beacon signal broadcasted by the relay terminal may comprise an identifier of the base station to indicate the base station to which the relayed link is established. The base station identifier may be a cell identifier identifying a cell associated with the base station. Alternatively or additionally, the relay terminal may broadcast a cellular network identifier, e.g. a public land mobile network (PLMN) identifier, to indicate the cellular network to which the relayed connection is provided. The beacon signal also comprises an identifier of the relay terminal. The identifier may be a temporary cellular radio identifier assigned by the base station (or another element of the cellular mobile telecommunication system) and, as a consequence, the relay terminal uses the same identifier for the cellular radio connection with the base station and for the direct device-to-device connections with the other terminal devices, for which the relay terminal establishes the relayed connection. The identity of the cellular network is used for the relayed connections for security, uniqueness, and protocol overhead deduction purposes. The temporary identifier of the relay terminal may be, for example, a 16-bit cell-specific radio network temporary identifier (C-RNTI) known in the UMTS.

Instead of providing explicit information on the availability of the relayed communication link, the relay terminal may indicate the availability of the relay connection implicitly by broadcasting specific connection-related information in the beacon signal in order to let the other (non-relay) terminals determine the suitability of the relayed connection. The implicit information should naturally be in line with the information and rules broadcasted by the base station in S4, because the non-relay terminals receive both information and rules broadcasted by the base station in S4 and implicit information broadcasted by the relay terminal in S5. Such information may comprise information on at least one of data rate, transport block sizes, frequency resources, a transmission power supported by the relay terminal for each radio access technology utilized for the relayed connection. At least some of the parameters may be defined by the base station in S3. Additionally, such information may comprise information on the radio environment experienced by the relay terminal.

In S6, the second terminal device detects the beacon signal broadcasted by the first terminal device. The second terminal device may have received the rules and information broadcasted by the base station in S4 and configured itself to scan for beacon signals of the radio access technologies indicated by the base station. Upon detection of the beacon signal from the first terminal device and determination that a relayed connection is necessary, e.g. due to a shadowed direct link with the base station, the second terminal negotiates a device-to-device communication link with the first terminal according to one of the radio access technologies based on the cognitive radio. The first and second terminals may use the identifiers described above in the device-to-device communication link. The type of identifiers used depends on the implementation. In one embodiment, both terminal devices use RFIDs. In another embodiment, the first terminal being in the RRC connected state uses C-RNTI, and the second terminal device being in the RRC idle state uses the paging token previously received from the cellular network. Upon negotiation of the device-to-device communication link of the second set between the terminal devices #1 and #2, the first terminal device negotiates with the base station that it will function as a relay between the base station and the second terminal device.

If the cognitive radio communication link between the terminal devices is established as a Bluetooth link or corresponding communication link normally requiring acceptance of a user to establish the communication link, the acceptance by the user may be replaced by an acceptance by the base station. Accordingly, if the second terminal device requests a Bluetooth communication link with the first terminal device, the first terminal device negotiates the request with the base station, and the base station approves the communication link. As a consequence, the second terminal device now has a communication link with the base station through the first terminal device.

Figure 5:
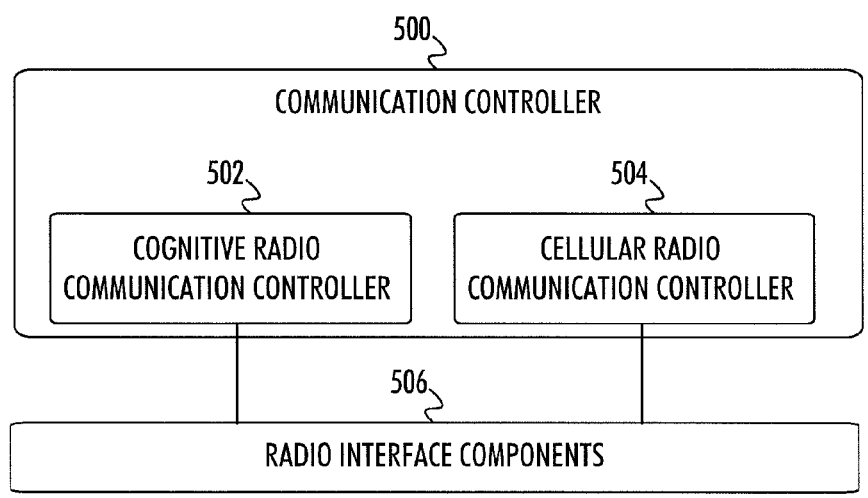
FIG. 5 illustrates elements of a relay-capable terminal according to an embodiment of the invention.

FIG. 5 illustrates radio communication elements of a relay-capable terminal device according to an embodiment of the invention. First of all, the terminal device comprises radio interface components 506 capable of providing radio communication parameters according to the physical layer protocols of one or more cellular telecommunication systems supported by the terminal device. Additionally, the radio interface components 506 may be configured to provide radio communication parameters according to a plurality of device-to-device radio communication protocols, e.g. one or more of the radio communication protocols listed above. The radio interface components 506 may include digital signal processing elements capable of providing multiple modulation, coding, and other signal processing operations on the base band for signals to be transmitted and/or received. Additionally, the radio interface components may comprise analog components, of which at least part may be software-defined to provide support for the wide range of radio access technologies.

The terminal device further comprises a higher-level controller 500 controlling the operation and inter-operability of both communication links of the first set (the cellular radio communication links with the serving base station and other parts of the serving cellular network) and the communication links of the second set (the cognitive radio communication links with other terminal devices). The communication controller 500 may provide linking between the cognitive radio connections and the cellular radio connections to provide the relayed link.

The communication controller 500 comprises two sub-controllers: a cognitive radio communication controller 502 and a cellular radio communication controller 504. The cellular radio communication controller 504 is configured to establish, operate, and terminate cellular radio connections with a serving base station of a serving cellular network. The cellular radio communication controller 504 may also convey data and control signals related to the cognitive radio communication links under the control of the higher-level communication controller 500. The communication controller 500 may communicate with the serving base station through the cellular radio communication controller 504 in order to negotiate radio access technologies for use in direct device-to-device communications with the other terminal devices in the same cell, communication parameters to be used, and the method of advertising the availability of the relayed communication link. The negotiation may comprise indicating the capabilities of the terminal device to the base station and reception of the configuration from the base station. For example, the communication controller 500 may communicate to the base station which radio access technologies, frequency bands and other communication parameters the terminal device supports. The base station may then select the configuration according to the capabilities of the terminal device and other factors, as discussed above in connection with FIG. 2.

The cognitive radio communication controller 502 is configured to establish, operate, and terminate cognitive radio connections established with the other terminal devices. The cognitive radio communication controller 502 may receive the radio access technologies and communication parameters available for use from the communication controller 500 and control the radio interface components 506 to broadcast one or more beacon signals to indicate the availability of the relayed connection to the other terminal devices. Upon reception of a request to establish a cognitive radio communication connection from another terminal device through the radio interface components 506, the cognitive radio communication controller 502 may be configured to first determine whether the request is a normal device-to-device communication request or a request for the provision of the relayed communication link. If the provision of the relayed communication link is requested, the cognitive radio communication controller 502 may indicate this to the communication controller 500 which may negotiate with the serving base station about the establishment of the relayed communication link and provide linking between the cognitive radio communication link and the cellular radio communication link. The establishment of the relayed communication link may include the establishment of a new logical connection between the relay terminal and the serving base station. Accordingly, the communication controller 500 may negotiate with the serving base station of the establishment of the new logical connection through the cellular radio communication controller.

Then, the cognitive radio communication controller 502 may determine the communication parameters to be used in the cognitive radio communication link on the basis of the available communication parameters and the channel environment between the two terminal devices. The cognitive radio communication controller may negotiate the communication parameters to be used with a corresponding cognitive radio communication controller in the other terminal device. The determination of the communication parameters may include the determination of modulation and coding schemes, frequency band, bandwidth, data rate, transport block size, diversity method, etc.

The procedure may be the same in the case of a normal device-to-device communication link except that the provision of the linking between the cognitive radio connection and the cellular connection may be omitted. Furthermore, negotiation between the communication controller 500 and the serving base station may also be omitted, because the communication controller 500 may already have all the necessary information for the establishment and operation of the device-to-device connections.

Upon establishment of the relayed communication link through the relay terminal, the communication controller 500 receives data from the other terminal device, for which the relaying is performed, through the cognitive radio communication controller 502 and maps the data to the logical connection established between the communication controller 500 and the serving base station. Similarly, the communication controller maps the data received from the serving base station over the established logical connection to the cognitive radio connection.

Figure 6:
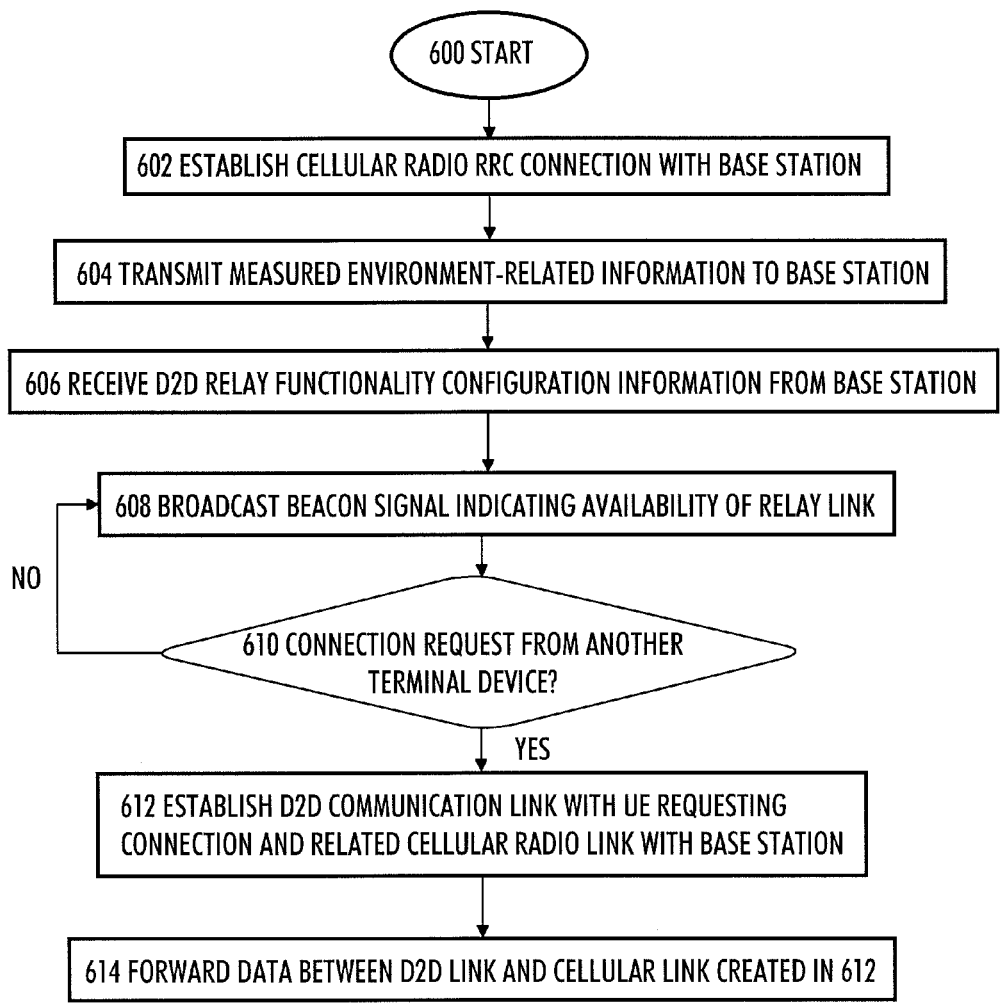
FIG. 6 is a flow diagram illustrating a process for providing a relay link in a relay-capable terminal according to an embodiment of the invention.

FIG. 6 is a flow diagram illustrating a process for providing a relay link in a relay-capable terminal device according to an embodiment of the invention. In particular, FIG. 6 illustrates the operation of the elements of FIG. 6. The process starts in block 600, and the relay terminal establishes the RRC connection with the base station in block 602. The relay terminal may be configured to be in the RRC connected state. In block 604, the relay terminal transmits measured environment-related information to the base station. The measured information may comprise one or more estimates of the communication channel, measurement results of received signal strengths associated with the serving base station and other base stations, measured location of the terminal device in the cell, measured battery power, etc.

In block 606, the relay terminal receives from the serving base station a device-to-device relay functionality configuration. The relay terminal may also use the same configuration for the other device-to-device links. As mentioned above, the configuration information may also comprise configuration of the type of beaconing the terminal device is to use when indicating to the other terminals of the availability of the relayed link.

In 608, the relay terminal broadcasts one or more beacon signals comprising information either on explicit or implicit availability of the relayed link. In block 610, it is determined whether or not the relay terminal receives a connection request from another terminal device. If not, the process returns to block 608. Otherwise, the relay terminal is determined to have received the connection request from another terminal device. The connection request may be a regular device-to-device connection request or a request to establish a relayed link to the serving base station. The request to establish the relayed link may be a request to establish a data connection or only a control signaling connection.

In block 612, the device-to-device communication link is established between the relay terminal and the other terminal device and related new logical connection with the base station, and data between the device-to-device link and the cellular link is forwarded in block 614. The relay terminal may establish either a data connection or only a control connection with the serving base station. In connection of establishment of the data connection, the control connection is also established, but the control connection may be established without the data connection. The idea behind the establishment of only the control connection is to receive information on transmission timings related to cognitive radio connections operating on the same frequency band as the cellular radio connections. Then, the terminal devices operating such cognitive radio connections may adjust their transmission timings such that the cognitive radio transmission does not interfere with the cellular radio connections. In other words, the timing information may be used to synchronize the terminals to the clock of the base station. Alternatively, the relay terminal may broadcast the timing information in block 608 either as an absolute timing or as a timing offset to a clock of the relay terminal. The reference time of the relay terminal may also be broadcasted. Alternatively, the time reference may be deduced from the frame structure on the signal received from the base station.

Additionally, the control signaling connection may be used to relay connection establishment information to the terminal device through the relay terminal. For example, the base station may transmit a dedicated random access channel preamble allocation or other corresponding information to the terminal device via the relay terminal to enable the terminal device to establish a direct communication link with the base station. Upon reception of the random access channel preamble or corresponding control information from the relay terminal, the terminal device may initiate a contention-free random access procedure to establish a connection with the base station more reliably.

The processes or methods described in FIGS. 2 and 6 may also be carried out in the form of a computer process defined by a computer program. The computer program may be in source code form, object code form, or in some intermediate form, and it may be stored on a carrier, which may be any entity or device capable of carrying the program. Such carriers include a record medium, computer memory, read-only memory, electrical carrier signal, telecommunication signal, and software distribution package, for example. Depending on the processing power needed, the computer program may be executed in a single electronic digital processing unit or it may be distributed amongst a number of processing units.

It will be obvious to a person skilled in the art that, as technology advances, the inventive concept can be implemented in various ways. The invention and its embodiments are not limited to the examples described above but may vary within the scope of the claims.

The invention claimed is:

1. A method, comprising:
controlling, at least partially, communication links within a cell associated with a base station of a cellular telecommunication system, wherein the communication links comprise a first set of communication links established between terminal devices and the base station and a second set of communication links established directly between the terminal devices according to one or more radio access technologies selected from a plurality of radio access technologies supported by the terminal devices for the second set of communication links;

selecting one or more of the terminal devices to be used as a relay terminal, the selecting being made adaptively according to communication environment in the cell and according to received information on capabilities of the terminal devices;

selecting one or more of the terminal devices to be a non-relay terminal;

sending a transmission configured to at least partially configure the one or more selected relay terminals, the one or more selected relay terminals forming a first portion of the terminal devices within the cell, to establish one or more relay links between the base station and the one or more non-relay terminals, and where the non-relay terminals form a different second portion of the terminal devices within the cell; and configuring the base station to transmit information elements directly to the non-relay terminals within the cell, where the information elements transmitted directly from the base station to the non-relay terminals are configured to enable the one or more non-relay terminals to establish a communication link of the second set to at least one of the one or more relay terminals, wherein the information elements indicate which radio access technology or technologies are used for the second set of communication links.

2. The method of claim 1, wherein the base station is configured to transmit the information elements to each terminal device capable of establishing a communication link of the second set as dedicated control signaling.

3. The method of claim 1, further comprising: configuring the selected relay terminal to broadcast information indicating to the one or more non-relay terminals that a communication link of the second set may be established with the relay terminal to enable a relayed communication connection with the base station.

4. The method of claim 3, further comprising: configuring the relay terminal to select one or more radio access technologies for the communication links of the second set; and configuring the relay terminal to broadcast a beacon signal of the one or more selected radio access technologies.

5. The method of claim 3, further comprising: configuring the relay terminal to broadcast an identifier of the base station to indicate that the relay terminal is configured to provide a relayed communication link to the base station.

6. The method of claim 1, further comprising:

assigning to each terminal device a temporary identifier for use in the communication links of the first set, wherein the temporary identifier is unique for each terminal device within a limited area; and configuring the terminal devices to use the assigned identifiers in communication over the communication links of the second set.

7. The method of claim 1, controlling the communication links further comprising:

allocating one or more communication links of the second set to the frequency band of the cellular telecommunication system; and configuring the communication links of the second set allocated to the frequency band of the cellular telecommunication system to use a radio access technology different from that used by the cellular telecommunication system.

8. The method of claim 1, wherein controlling the communication links further comprises: configuring terminal devices that support the second set of communication links and are in an idle state to transmit a measurement report related to the radio environment of the second set of communication links to the base station.

9. The method of claim 1, wherein controlling the communication links further comprises: configuring terminal devices in an idle state to transmit a location update message indicating the location of the terminal device to the base station through a relay link provided by a relay terminal.

10. A computer program product embodied on a non-transitory distribution medium readable by a computer and comprising program instructions which, when loaded into a computer, execute the method according to claim 1.

11. A method comprising:

controlling, at least partially, communication links within a cell associated with a base station of a cellular telecommunication system, wherein the communication links comprise a first set of communication links established between terminal devices and the base station and a second set of communication links established directly between the terminal devices according to one or more radio access technologies selected from a plurality of radio access technologies supported by the terminal devices for the second set of communication links;

selecting one or more of the terminal devices to be used as a relay terminal, the selecting being made adaptively according to communication environment in the cell and according to received information on capabilities of the terminal devices;

selecting one or more of the terminal devices to be a non-relay terminal;

sending a transmission configured to at least partially configure the one or more selected relay terminals, the one or more selected relay terminals forming a first portion of the terminal devices within the cell, to establish one or more relay links between the base station and the one or more non-relay terminals, and where the non-relay terminals form a different second portion of the terminal devices within the cell;

configuring the base station to transmit information elements directly to the non-relay terminals within the cell, where the information elements transmitted directly from the base station to the non-relay terminals are configured to enable the one or more non-relay terminals to establish a communication link of the second set to at least one of the one or more relay terminals; and configuring the base station to transmit configuration information configuring the relay terminals to provide the communication links of the second set, wherein the configuration information indicates the one or more radio access technologies to be used for the communication links of the second set.

12. The method of claim 11, further comprising: negotiating between the base station and a selected relay terminal in radio resource control signaling transmission parameters for a given radio access technology to be used as the communication link of the second set.

13. A method comprising:

controlling, at least partially, communication links within a cell associated with a base station of a cellular telecommunication system, wherein the communication links comprise a first set of communication links established between terminal devices and the base station and a second set of communication links established directly between the terminal devices according to one or more radio access technologies selected from a plurality of radio access technologies supported by the terminal devices for the second set of communication links;

selecting one or more of the terminal devices to be used as a relay terminal, the selecting being made adaptively according to communication environment in the cell and according to received information on capabilities of the terminal devices;

selecting one or more of the terminal devices to be a non-relay terminal;

sending a transmission configured to at least partially configure the one or more selected relay terminals, the one or more selected relay terminals forming a first portion of the terminal devices within the cell, to establish one or more relay links between the base station and the one or more non-relay terminals, and where the non-relay terminals form a different second portion of the terminal devices within the cell;

configuring the base station to transmit information elements directly to the non-relay terminals within the cell, where the information elements transmitted directly from the base station to the non-relay terminals are configured to enable the one or more non-relay terminals to establish a communication link of the second set to at least one of the one or more relay terminals;

configuring the selected relay terminal to broadcast information indicating to the one or more non-relay terminals that a communication link of the second set may be established with the relay terminal to enable a relayed communication connection with the base station; and configuring the relay terminal to broadcast information on communication link parameters and the quality of the communication link between the relay terminal and the base station to enable the one or more non-relay terminals to determine whether or not to establish the communication link of the second set with the relay terminal.

14. An apparatus comprising:
at least one processor; and
at least one non-transitory memory including computer program code, the at least one memory and the computer program code configured to, with the at least one processor, cause the apparatus to:
control, at least partially, communication links within a cell associated with a base station of a cellular telecommunication system, wherein the communication links comprise a first set of communication links established between terminal devices and the base station and a second set of communication links established directly between the terminal devices according to one or more radio access technologies selected from a plurality of radio access technologies supported by the terminal devices for the second set of communication links, to select one or more of the terminal devices to be used as a non-relay terminal, to select one or more of the terminal devices to be used as a relay terminal, the selection being made adaptively according to communication environment in the cell and according to received information on capabilities of the terminal devices, to configure the one or more relay terminals, the one or more relay terminals forming a first portion of the terminal devices within the cell, to establish one or more relay links between the base station and one or more non-relay terminals, where the non-relay terminals form a different second portion of the terminal devices within the cell, and to configure the base station to transmit information elements directly to the non-relay terminals within the cell, where the information elements to be transmitted directly from the base station to the non-relay terminals are configured to enable the one or more non-relay terminals to establish a communication link of the second set to at least one of the one or more relay terminals, wherein the apparatus is further configured to configure the base station to broadcast information elements that indicate which radio access technology or technologies are used for the second set of communication links.

15. The apparatus of claim 14, wherein the at least one non-transitory memory and the computer program code, with the at least one processor, are further configured to configure the base station to transmit the information elements to each terminal device capable of establishing a communication link of the second set as dedicated control signaling.

16. The apparatus according to claim 14, wherein the at least one non-transitory memory and the computer program code, with the at least one processor, are further configured to configure the selected relay terminal to broadcast information indicating to the one or more non-relay terminals that a communication link of the second set may be established with the relay terminal to enable a relayed communication connection with the base station.

17. The apparatus of claim 16, wherein the at least one non-transitory memory and the computer program code, with the at least one processor, are further configured to configure the relay terminal to select one or more radio access technologies for the communication links of the second set and to configure the relay terminal to broadcast a beacon signal of the selected one or more radio access technologies.

18. The apparatus according to claim 16, wherein the at least one non-transitory memory and the computer program code, with the at least one processor, are further configured to configure the relay terminal to broadcast an identifier of the base station to indicate that the relay terminal is configured to provide a relayed communication link to the base station.

19. The apparatus according to claim 14, wherein the at least one non-transitory memory and the computer program code, with the at least one processor, are further configured to assign to each terminal device a temporary identifier for use in the communication links of the first set, wherein the temporary identifier is unique for each terminal device within a limited area, and to configure the terminal devices to use the assigned identifiers in communication over the communication links of the second set.

20. The apparatus according to claim 14, wherein the at least one non-transitory memory and the computer program code, with the at least one processor, are further configured to allocate one or more communication links of the second set to the frequency band of the cellular telecommunication system, and to configure the communication links of the second set allocated to the frequency band of the cellular telecommunication system to use a radio access technology different from that used by the cellular telecommunication system.

21. The apparatus according to claim 14, wherein the at least one non-transitory memory and the computer program code, with the at least one processor, are further configured to configure terminal devices that support the second set of communication links and are in an idle state to transmit a measurement report related to the radio environment of the second set of communication links to the base station.

22. The apparatus according to claim 14, wherein the at least one non-transitory memory and the computer program code, with the at least one processor, are further configured to configure terminal devices in an idle state to transmit a location update message indicating the location of the terminal device to the base station through a relay link provided by a relay terminal.

23. An apparatus comprising:
at least one processor; and
at least one non-transitory memory including computer program code, the at least one memory and the computer program code configured to, with the at least one processor, cause the apparatus to:
control, at least partially, communication links within a cell associated with a base station of a cellular telecommunication system, wherein the communication links comprise a first set of communication links established between terminal devices and the base station and a second set of communication links established directly between the terminal devices according to one or more radio access technologies selected from a plurality of radio access technologies supported by the terminal devices for the second set of communication links, to select one or more of the terminal devices to be used as a non-relay terminal, to select one or more of the terminal devices to be used as a relay terminal, the selection being made adaptively according to communication environment in the cell and according to received information on capabilities of the terminal devices, to configure the one or more relay terminals, the one or more relay terminals forming a first portion of the terminal devices within the cell, to establish one or more relay links between the base station and one or more non-relay terminals, where the non-relay terminals form a different second portion of the terminal devices within the cell, and to configure the base station to transmit information elements directly to the non-relay terminals within the cell, where the information elements to be transmitted directly from the base station to the non-relay terminals are configured to enable the one or more non-relay terminals to establish a communication link of the second set to at least one of the one or more relay terminals, wherein the apparatus is further configured to configure the base station to transmit configuration information configuring the relay terminals to provide the communication links of the second set, wherein the configuration information indicates the one or more radio access technologies to be used for the communication links of the second set.

24. The apparatus of claim 23, wherein the at least one non-transitory memory and the computer program code, with the at least one processor, are further configured to negotiate with a selected relay terminal as radio resource control signaling transmission parameters for a given radio access technology to be used as the communication link of the second set.

25. An apparatus comprising:
at least one processor; and
at least one non-transitory memory including computer program code, the at least one memory and the computer program code configured to, with the at least one processor, cause the apparatus to:
control, at least partially, communication links within a cell associated with a base station of a cellular telecommunication system, wherein the communication links comprise a first set of communication links established between terminal devices and the base station and a second set of communication links established directly between the terminal devices according to one or more radio access technologies selected from a plurality of radio access technologies supported by the terminal devices for the second set of communication links, to select one or more of the terminal devices to be used as a non-relay terminal, to select one or more of the terminal devices to be used as a relay terminal, the selection being made adaptively according to communication environment in the cell and according to received information on capabilities of the terminal devices, to configure the one or more relay terminals, the one or more relay terminals forming a first portion of the terminal devices within the cell, to establish one or more relay links between the base station and one or more non-relay terminals, where the non-relay terminals form a different second portion of the terminal devices within the cell, and to configure the base station to transmit information elements directly to the non-relay terminals within the cell, where the information elements to be transmitted directly from the base station to the non-relay terminals are configured to enable the one or more non-relay terminals to establish a communication link of the second set to at least one of the one or more relay terminals, wherein the apparatus is further configured to configure the selected relay terminal to broadcast information indicating to the one or more non-relay terminals that a communication link of the second set may be established with the relay terminal to enable a relayed communication connection with the base station, wherein the apparatus is further configured to configure the relay terminal to broadcast information on communication link parameters and the quality of the communication link between the relay terminal and the base station to enable the one or more non-relay terminals to determine whether or not to establish the communication link of the second set with the relay terminal.

* * * * *